United States Patent Office 3,409,593
Patented Nov. 5, 1968

3,409,593
POLYETHERS AND PROCESS FOR THEIR MANUFACTURE
Günter Messwarb, Kelkheim, Taunus, Walter Lüders Neu-Isenburg, and Johannes Munder, Hans Ruckert, and Hartmut Steppan, Wiesbaden, Germany, assignors to Farbwerke Hoechst Aktiengesellschaft vormals Meister Lucius & Bruning, Frankfurt am Main, Germany, a corporation of Germany
No Drawing. Filed Jan. 3, 1967, Ser. No. 606,546
Claims priority, application Germany, Jan. 7, 1966, F 48,109
6 Claims. (Cl. 260—47)

ABSTRACT OF THE DISCLOSURE

Light-sensitive polyethers produced by copolymerization of an oxirane group containing compounds in the presence of ionic catalysts and suitable for the manufacture of films, sheetings, coatings and shaped articles which can be cross-linked under the action of light.

---

It is an object of this invention to provide novel copolymers which, according to their chemical structure, belong to the class of polyethers and are capable of undergoing reactions, for example cross-linking reactions and grafting reactions, under the action of luminous rays. It is another object of this invention to provide a process for the manufacture of the said polyethers.

It is known that polyethers of high molecular weight can be obtained from compounds containing epoxide groups by polymerization in the presence of special catalysts.

Polymers of this type, for example polyethylene oxide, polypropylene oxide, polyepichlorohydrin, or copolymers of ethylene oxide, propylene oxide, epichlorohydrin, glycidyl compounds and other monomers containing epoxide groups have gained industrial interest.

Polyethylene oxide of high molecular weight can be used, for example, for the manufacture of films or as binder in the preparation of coating compositions. Polypropylene oxide and polyepichlorohydrin have been recommended as rubber-like materials.

It has also been proposed to improve to a greater or lesser extent the mechanical properties of thermoplastic and elastomeric polymers by subsequent cross-linking (vulcanization).

According to another proposal unsaturated polyethers, for example, copolymers of propylene oxide and allyl glycidyl ether, are subjected to the known vulcanization with sulfur. Other cross-linking reactions known to the expert for products of the polyether type are the reaction with peroxides or the treatment of chlorine-containing polymers with polyamines.

Cross-linking reactions as specified above put considerable chemical and thermal strain on the polymers to be cross-linked. Consequently, discolorations of the products, disagreeable odor and partial chain cleavage must be taken into account, especially in the presence of aggressive cross-linking auxiliaries.

The present invention provides a process for the manufacture of polyethers which comprises copolymerizing compounds of Formula I

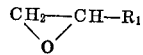

in which $R_1$ stands for hydrogen, alkyl, aryl, halogenoalkyl or —$CH_2OR_2$, $R_2$ being alkyl, allyl, aryl or vinyl, with compounds of Formula II

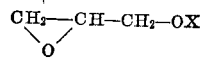

in which X stands for a radical of one of the formulae

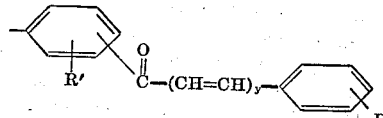

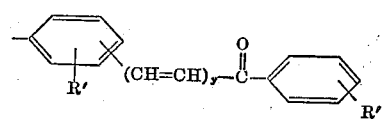

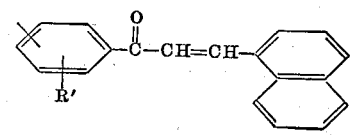

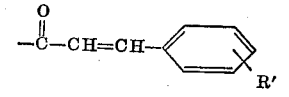

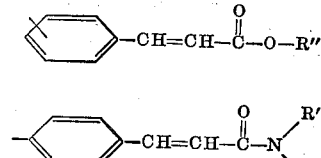

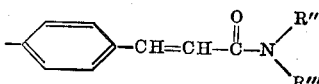

in which formulae

R' represents hydrogen, alkyl, alkoxy, or halogen and may occur several times and alkyl and alkoxy may form a ring;
R" represents alkyl or aryl;
R''' represents alkyl and
y stands for a whole number in the range of from 1 to 4, in the presence of ionic catalysts which, under the polymerization conditions, cause an opening of oxirane rings.

More particularly, in the compounds of Formula I used in the copolymerization:
$R_1$ has the following meaning: hydrogen; alkyl, preferably methyl and ethyl; aryl, preferably phenyl, ethylphenyl and halogenophenyl, the halogen being fluorine, chlorine, bromine or iodine; halogenoalkyl, preferably —$(CH_2)_nCl$ or —$(CH_2)_nF$ in which $n$ stands for 1 or 2, —$CHCl_2$, —$CHF_2$, —$(CH_2)_mCCl_3$, —$(CH_2)_mCF_3$ in which $m$ is zero or 1, —CHCl—$CH_2Cl$, —CHF—$CH_2F$; —$CH_2$—$OR_2$ in which $R_2$ stands for alkyl with 1 to 5 carbon atoms, allyl, vinyl or aryl, preferably phenyl or alkylphenyl, the alkyl having 1 to 5 carbon atoms;
in the compounds of Formula II:
R' stands for hydrogen; alkyl with 1 to 5 carbon atoms, alkoxy with 1 to 5 carbon atoms, or fluorine, chlorine, bromine or iodine;
R" stands for alkyl with 1 to 5 carbon atoms, aryl, preferably phenyl or alkyl phenyl in which the alkyl group has 1 to 5 carbon atoms;
R''' stands for alkyl with 1 to 5 carbon atoms.

The polyethers prepared by the process according to the invention can be further reacted, for instance cross-linked, for example in the form of films, coatings or shaped articles, in the presence of free radicals under the action of light of a wave length of 2000 to 7000 A., if desired with the addition of usual additives.

A special advantage resides in the fact that the polyethers can be cross-linked under very mild conditions within a short period of time in the absence of the common, aggressive cross-linking agents. The mechanical properties of sheet-like structures from polyethers are thus improved and their surface is cured.

This mode of operation permits to modify in a predetermined manner the surfaces of polyether structures. A cross-linking reaction considerably improves, for example, the stability of polyether films towards solvents.

It has already been proposed to make light-sensitive polymers of different structures by subsequent incorporation of cinnamic acid groups or chalcone groups into polymers that are per se not sensitive to light.

Products of this type can be cross-linked—analogous to the low molecular weight reaction of cinnamic acid to truxillic acid—by dimerization of the light-sensitive groups by irradiation with light of the above wave lengths.

It has also been proposed to make reactive polymers which, however, are no polyethers, by directly polymerizing unsaturated compounds containing cinnamic acid groups or chalcone groups. In this case the polymerization does not take the desired course, because of the presence of two double bonds in the monomer. From cinnamic acid vinyl ester there are obtained, for example, insoluble polymers, and when the process is carried out under very mild conditions polymers with γ-lactone rings which are soluble because of a cyclopolymerization mechanism are obtained.

Moreover, it could not be forseen that the incorporation of cinnamic acid groups and chalcone groups into polymers of the polyether type in accordance with the invention would lead to products of surprisingly high reactivity to ultraviolet light and in many cases even to daylight and incandescent light, which could not be expected.

As component I for the polyethers produced according to the invention there can be used, for example, alkylene oxides such as ethylene oxide, propylene oxide, butylene oxide; substituted alkylene oxides such as epichlorohydrin, epibromohydrin, 1,2-dichloro-3,4-epoxybutane, 1-chloro-3,4-epoxybutane, 1-chloro-4,5-epoxypentane, 1,1-dichloro-2,3-epoxypropane, 1,1,1-trichloro 2,3-epoxypropane, 1,1,1-trichloro-3,4-epoxybutane; epoxy ethers, such as methylglycidyl ether, isobutylglycidyl ether, tert. butylglycidyl ether, n-hexylglycidyl ether, n-octylglycidyl ether, phenylglycidyl ether, chlorophenylglycidyl ether, alkylphenylglycidyl ethers, chloroalkylphenylglycidyl ethers; or unsaturated glycidyl ethers such as vinylglycidyl ether, allylglycidyl ether; as well as other epoxides such as styrene oxide or butadiene monoepoxide. In the process according to the invention ethylene oxide, propylene oxide, epichlorohydrin and styrene oxide are preferably used.

As light-sensitive component II the following compounds are preferably used:

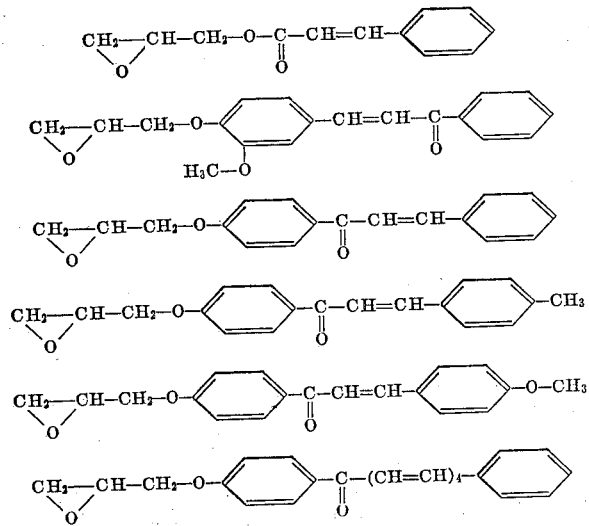

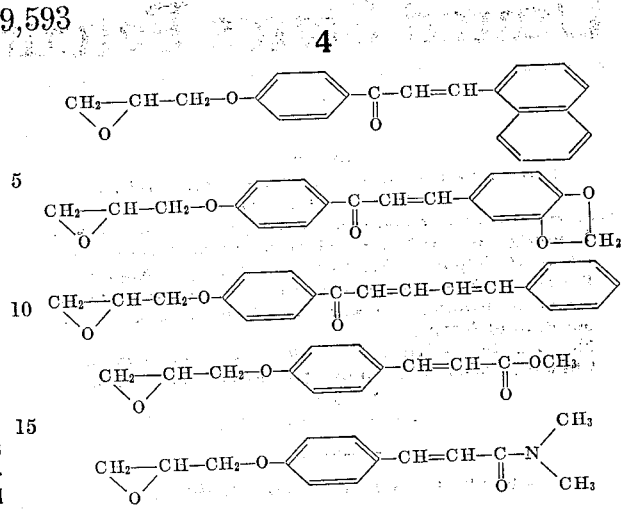

It is particularly advantageous to copolymerize as component II cinnamalacetophenone - (4) - glycidyl ether, piperonalacetophenone-(4)-glycidyl ether and p-methoxyacetophenone-(4)-glycidyl ether with the oxide compounds as component I.

The new copolymers in accordance with the invention are far superior to mere mixtures of polyethers not sensitive to light and corresponding light-sensitive monomeric glycidyl compounds as regards the cross-linking effects brought about by light under comparable test conditions under the same action of light.

In the polyethers according to the invention the glycidyl compound II containing cinnamic acid groups or chalcone groups should be present in an amount of at least 0.01 mol percent, preferably more than 0.1 mol percent, calculated on the copolymer. Copolymers containing, incorporated therewith, 0.1 to 10 mol percent, calculated on the copolymer, of active glycidyl compound have especially interesting properties. In principle, higher proportions of component II may also be incorporated, but, in general, such higher proportions will not be used for economical considerations as they do not involve a noticeable advantage justifying the higher amounts of this monomer.

The light-sensitive glycidyl compounds II containing cinnamic acid groups or chalcone groups may be incorporated into the polyether chain either statistically or in blocks or they may be bound to the terminal groups. It is immaterial in the process of the invention whether the light-sensitized polyethers are amorphous, crystalline, with or without steric arrangement.

In the polymerization according to the invention ionic catalyst systems are used which cause oxirane rings to open under the polymerization conditions. Suitable catalysts are, for example, alkali metal and alkaline earth metal hydroxides, calcium amide, zinc carbonate, ferric chloride, ferric alkoxides, ferric salts, $SbCl_5$, $SnCl_4$, $BF_3$ or $BF_3$-etherate. Preferred catalysts are oragnic compounds of the metals aluminum, zinc and magnesium of the general formula $$Me_xR'R''_{x-1}$$

in which Me represents a metal having the valence $x$, R' stands for alkyl, preferably methyl or ethyl; R'' is hydrogen, alkyl, preferably methyl or ethyl, or alkoxy, advantageously methoxy or ethoxy, or hydroxy.

The catalysts are prepared in known manner from the metal alkyls with the addition of defined small amounts of water and complex-forming agents.

The copolymerization according to the invention is carried out at a temperature in the range of from 20 to 100° C., advantageously 30 to 80° C.

Suitable solvents for carrying out the polymerization are, for example, aliphatic and aromatic hydrocarbons, preferably petroleum hydrocarbons boiling at a temperature in the range of from 50 to 150° C., benzene, toluene, chlorohydrocarbons, preferably carbon tetrachloride, and occasionally ether.

It has proved advantageous to eliminate the action of daylight and lighting during polymerization and working up of the polymeric products.

In solution cross-linking takes place much more slowly than in the solid phase. It is therefore also possible in principle to polymerize and work up the polymer under diffused light or ruby light.

Films, sheetings, coatings and shaped articles are made from the polyethers, which are generally obtained in solution, according to known methods. It is obvious that in this stage of the process light must be eliminated to as far an extent as possible.

The copolymerization according to the invention is advantageously carried out with the exclusion of oxygen, for example in a nitrogen atmosphere. It is absolutely necessary to exclude moisture to as far an extent as possible.

The reaction initiated by light of the polyethers according to the invention can be induced either by the action of sunlight or by suitable artificial sources of light.

In order to obtain an optimum cross-linking effect it is expedient to remove residual solvents and other disturbing impurities by an appropriate conditioning of the polyether layers to be irradiated. Experience has proved that it is favorable to condense the material before it is exposed to radiation, for example on a calender or by compression.

The copolymers produced by the process of the invention can be used as coating masses for textiles, sheetings and shaped articles.

The following examples serve to illustrate the invention but are not intended to limit it, the parts and percentages being by weight.

Example 1

Into a polymerization vessel protected against radiation of light there were introduced under nitrogen 100 parts of benzene, 7.5 parts of propylene oxide, 2 parts of ethylene oxide, 0.5 part of cinnamalacetophenoneglycidyl ether-(4) and 4.5 parts of a catalyst solution consisting of 4.12 parts of aluminum triethyl dissolved in 11.23 parts of n-heptane and 6.94 parts of diethyl ether, 0.31 part of water and 1.76 parts of acetylacetone. The mixture was stirred for 4 hours at 70° C. The polymerization was then interrupted by adding 2 parts of anhydrous ethanol.

By expelling the solvent by steam distillation, a rubber-elastic solid substance was obtained, which was dried for 16 hours at 50° C. in vacuo. The yield was 65%.

For comparison, a copolymer of 7.5 parts of propylene oxide and 2 parts of ethylene oxide was prepared in analogous manner.

Of each of the two polymers films 0.1 mm thick were cast from a benzenic solution and exposed for 10 minutes to the radiation of a combined mercury vapor and incandescent lamp (Philips MLL 160 W) at a distance of 18 cm.

After that treatment, the film obtained from the copolymer containing cinnamalacetophenoneglycidyl ether-(4) was insoluble in benzene, contrary to the comparative film.

Example 2

Into a polymerization vessel protected against radiation of light there were introduced under nitrogen 100 parts of benzene, 9.75 parts of ethylene oxide, 0.25 part of piperonalacetophenoneglycidyl ether-(4) and 4.5 parts of a catalyst solution consisting of 4.12 parts of aluminum triethyl dissolved in 11.23 parts of n-heptane and 6.94 parts of diethyl ether, 0.31 part of water and 1.76 parts of acetylacetone. The mixture was stirred for 4 hours at 70° C. The polymerization was then interrupted by adding 2 parts of anhydrous ethanol.

By expelling the solvent by steam distillation, a rubber-elastic solid substance was obtained which was dried for 16 hours at 50° C. in vacuo. The yield was 85%.

For comparison, polyethylene oxide was prepared in analogous manner. Of each of the two polymers films 0.1 mm. thick were cast from a benzenic solution and exposed for 20 minutes to the radiation of a combined mercury vapor and incandescent lamp (Philips MLL 160 W) at a distance of 18 cm.

After that treatment, the film obtained from the copolymer containing piperonalacetophenone-(4)-glycidyl ether was insoluble in benzene, contrary to the polyethylene oxide film.

Example 3

In a polymerization vessel protected against radiation of light 100 parts of toluene and 6.15 parts of a catalyst solution consisting of 4.12 parts of aluminum triethyl dissolved in 11.23 parts of n-heptane and 6.94 parts of diethyl ether, 0.31 part of water and 1.76 parts of acetylacetone, were heated to 60° C. under nitrogen. A mixture of 6.25 parts of propylene oxide, 3.5 parts of phenylglycidyl ether and 0.25 part of cinnamalacetophenone-(4)-glycidyl ether was added dropwise within 1 hour, while stirring. After 7 hours at 60° C., the polymerization was interrupted by adding 2 parts of ethanol. The solution was concentrated by evaporation at 50° C. in vacuo. The yield was 55%.

For comparison a copolymer of 6.25 parts of propylene oxide and 3.5 parts of phenylglycidyl ether was prepared in analogous manner. Of each of the two polymers films 0.1 mm. thick were cast from a benzenic solution and exposed for 10 minutes to the radiation of a combined mercury vapor and incandescent lamp (Philips MLL 160 W) at a distance of 18cm.

After that treatment, the film obtained from the copolymer containing cinnamalacetophenone-(4)-glycidyl ether was insoluble in benzene, contrary to the comparative film.

Example 4

In a polymerization vessel protected against radiation of light 100 parts of benzene, 7.5 parts of propylene oxide, 2 parts of ethylene oxide, 0.5 part of p-methoxybenzalacetophenone-(4)-glycidyl ether and 6.15 parts of a catalyst solution consisting of 4.12 parts of aluminum triethyl dissolved in 11.23 parts of n-heptane and 6.94 parts of diethyl ether, 0.31 part of water and 1.76 parts of acetylacetone, were stirred for 5 hours at 70° C. under nitrogen.

The polymerization was then interrupted by adding 2 parts of ethanol. The solution was concentrated by evaporation at 50° C. in vacuo. The yield was 55%.

For comparison a copolymer of 7.5 parts of propylene oxide and 2 parts of ethylene oxide was prepared in analogous manner. Of each of the two polymers films 0.1 mm. thick were cast from a benzenic solution and exposed for 15 minutes to the radiation of ultraviolet rays (mercury maximum pressure burner Q 81, capacity 70 W, Original Hanau (registered trademark) ) at a distance of 10 cm.

After that treatment, the film of the copolymer containing p-methoxybenzalacetophenone-(4)-glycidyl ether was insoluble in benzene, contrary to the comparative film.

Example 5

Into a polymerization vessel protected against the radiation of light there were introduced under nitrogen 100 parts of benzene and 6.15 parts of a catalyst solution consisting of 4.12 parts of aluminum triethyl dissolved in 11.23 parts of n-heptane and 6.94 parts of diethyl ether, 0.31 part of water and 1.76 parts of acetylacetone, and the mixture was heated to 60° C. Within 1 hour, a mixture of 9.5 parts of ethylene oxide and 0.25 part of 3-methoxybenzalacetophenoneglycidyl ether-4 was added dropwise while stirring. After 7 hours at 60° C., the polymerization was interrupted by adding 2 parts of ethanol. The solution was concentrated by evaporation at 50° C. in vacuo. The yield was 60%.

Of the copolymer so obtained a film 0.1 mm. thick was cast from a benzenic solution and exposed for 5 minutes to the radiation of a combined mercury vapor and incandescent lamp (Philips MLL 160 W) at a distance of 18 cm.

After that treatment, the film was insoluble in benzene, contrary to a film of polyethylene oxide which had been obtained by the same process and treated in the same manner.

Example 6

Into a polymerization vessel protected against the radiation of light there were introduced under nitrogen 100 parts of benzene and 6.15 parts of a catalyst solution consisting of 4.12 parts of aluminum triethyl dissolved in 11.23 parts of n-heptane and 6.94 parts of diethyl ether, and 0.31 part of water and 1.76 parts of acetylacetone, and the mixture was heated to 60° C. Within 1 hour, a mixture of 9.8 parts of ethylene oxide and 0.2 part of phenyl-heptatrienalacetophenoneglycidyl ether-4 was added dropwise while stirring. After 7 hours at 60° C., the polymerization was interrupted by adding 2 parts of ethanol. The solution was concentrated by evaporation at 50° C. in vacuo. The yield was 100%.

Of the copolymer so obtained a film 0.1 mm. thick was cast from a benzenic solution and exposed for 5 minutes to the radiation of a combined mercury vapor and incandescent lamp (Philips MLL 160 W) at a distance of 18 cm.

After that treatment, the film was insoluble in benzene, contrary to a film of polyethylene oxide which had been obtained by the same process and treated in the same manner.

Example 7

Into a polymerization vessel protected against radiation of light there were introduced under nitrogen 100 parts of toluene, 9.75 parts of ethylene oxide, 0.25 part of cinnamic acid glycidyl ester and 6.15 parts of a catalyst solution consisting of 4.12 parts of aluminum triethyl dissolved in 11.23 parts of n-heptane and 6.94 parts of diethyl ether, 0.31 part of water and 1.76 parts of acetylacetone, and the whole was stirred for 7 hours at 60° C.

The polymerization was then interrupted by adding 2 parts of ethanol. The solution was concentrated by evaporation at 50° C. in vacuo. The yield was 60%.

From the copolymer so obtained a film 0.1 mm. thick was cast from a benzenic solution and exposed for 5 minutes to the radiation of ultraviolet rays (mercury maximum pressure burner Q 81, capacity 70 W, Original Hanau (registered trademark)) at a distance of 10 cm.

After that treatment, the film was insoluble in benzene, contrary to a film of polyethylene oxide obtained by the same process and treated in the same manner.

Example 8

Into a polymerization vessel protected against radiation of light there were introduced under nitrogen 50 parts of dioxane and 6.15 parts of a catalyst solution consisting of 4.12 parts of aluminum triethyl dissolved in 11.23 parts of n-heptane and 6.94 parts of diethyl ether, 0.31 part of water and 1.76 parts of acetylacetone, and the whole was heated to 70° C.

Within 1 hour, a mixture of 40 parts of dioxane, 9.5 parts of ethylene oxide and 0.5 part of N-[4-(2,3-epoxy)-propoxycinnamoyl]-pyrrolidine was added dropwise while stirring. Stirring was continued for 6 hours at 70° C. and the polymerization was then interrupted by adding 2 parts of ethanol. The solution was concentrated by evaporation at 50° C. in vacuo. The yield was 72%.

Of the copolymer so obtained a film 0.1 mm. thick was cast from a benzenic solution and exposed for 10 minutes to the radiation of ultraviolet rays (mercury maximum pressure burner Q 81, capacity 70 W, Original Hanau (registered trademark)) at a distance of 10 cm.

After that treatment, the film was insoluble in benzene, contrary to a film of polyethylene oxide obtained by the same process and treated in the same manner.

What is claimed is:
1. A process for the manufacture of polyethers wherein
(a) compounds of Formula I

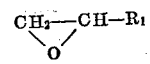

in which: $R_1$ stands for hydrogen, methyl, ethyl, phenyl, ethylphenyl, halogenophenyl, $-(CH_2)_nCl$ or $-(CH_2)_nF$, $n$ being 1 or 2, $-CHCl_2$, $-CHF_2$, $-(CH_2)_mCCl_3$ or $-(CH_2)_mCF_3$, $m$ being zero or 1, $-CHCl-CH_2Cl$, $-CHF-CH_2F$, or $-CH_2-OR_2$, $R_2$ being alkyl with 1 to 5 carbon atoms, allyl, vinyl, phenyl or alkylphenyl in which the alkyl group has 1 to 5 carbon atoms, are copolymerized with the substantial exclusion of light, under an inert atmosphere, under anhydrous condition in the presence of ionic catalysts which, under the polymerization conditions, bring about an opening of oxirane rings, with
(b) compounds of Formula II

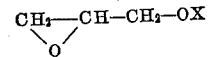

in which X stands for a radical of one of the following formulae

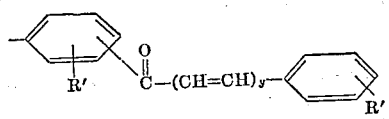

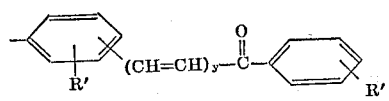

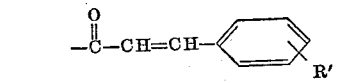

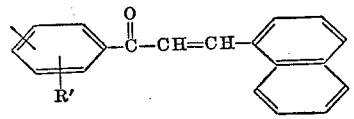

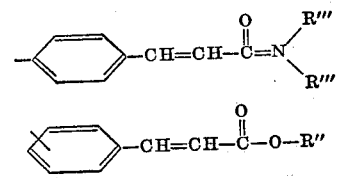

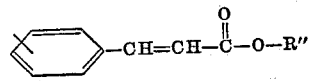

in which formulae
R' represents hydrogen, alkyl with 1 to 5 carbon atoms, alkoxy with 1 to 5 carbon atoms or halogen and may occur several times and the alkyl and alkoxy radicals may be members of a 5 membered ring,
R'' represents alkyl with 1 to 5 carbon atoms, phenyl or alkylphenyl in which the alkyl group has 1 to 5 carbon atoms,
R''' represents alkyl with 1 to 5 carbon atoms and
$y$ is a whole number in the range of from 1 to 4.

2. The process of claim 1, wherein component II is used in an amount of 0.1–10 mol percent, calculated on the copolymer.

3. The process of claim 1, wherein ethylene oxide is used as component I.

4. The process of claim 1, wherein propylene oxide is used as component I.

5. The process of claim 1, wherein component II is cinnamalacetophenone-(4)-glycidyl ether, piperonalacetophenone-(4)-glycidyl ether or p-methoxy-acetophenone-(4)-glycidyl ether.

6. Copolymers from
(a) compounds of Formula I

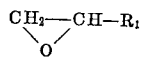

in which $R_1$ stands for hydrogen, methyl, ethyl, phenyl, ethylphenyl, halogenophenyl, —$(CH_2)_nCl$ or —$(CH_2)_nF$, $n$ being 1 or 2, —$CHCl_2$, —$CHF_2$, —$(CH_2)_m CCl_3$ or —$(CH_2)_m CF_3$, $m$ being zero or 1, —$CHCl$—$CH_2$—$Cl$, $CHF$—$CH_2F$, or —$CH_2$—$OR_2$, $R_2$ being alkyl with 1 to 5 carbon atoms, allyl, vinyl, phenyl or alkylphenyl in which the alkyl group has 1 to 5 carbon atoms, and
(b) compounds of Formula II

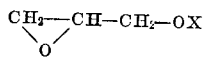

in which X stands for a radical of one of the following formulae

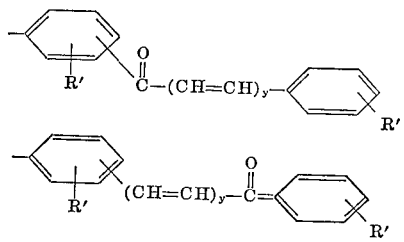

in which formulae

R' represents hydrogen, alkyl with 1 to 5 carbon atoms, alkoxy with 1 to 5 carbon atoms or halogen and may occur several times and the alkyl and alkoxy radicals may be members of a 5 membered ring, R" represents alkyl with 1 to 5 carbon atoms, phenyl or alkylphenyl in which the alkyl group has 1 to 5 carbon atoms, R'" represents alkyl with 1 to 5 carbon atoms and $y$ is a whole number in the range of from 1 to 4.

References Cited
UNITED STATES PATENTS 3,135,705  6/1964  Vandenberg.
3,200,086  8/1965  Coleman _____ 260—63

WILLIAM H. SHORT, *Primary Examiner.*

T. D. KERWIN, *Assistant Examiner.*